(12) United States Patent
Harrington

(10) Patent No.: US 11,539,211 B2
(45) Date of Patent: Dec. 27, 2022

(54) FAST-SLOW INJECTION FOR RECOVERY FROM TRANSIENT RESPONSE AND VOLTAGE COLLAPSE WITH AVOIDANCE OF SSR AND SSCI

(71) Applicant: Smart Wires Inc., Union City, CA (US)

(72) Inventor: Paul Harrington, Oatley (AU)

(73) Assignee: Smart Wires Inc., Durham, NC (US)

(*) Notice: Subject to any disclaimer, the term of this patent is extended or adjusted under 35 U.S.C. 154(b) by 455 days.

(21) Appl. No.: 16/838,720

(22) Filed: Apr. 2, 2020

(65) Prior Publication Data

US 2020/0395756 A1    Dec. 17, 2020

Related U.S. Application Data

(60) Provisional application No. 62/860,159, filed on Jun. 11, 2019.

(51) Int. Cl.
| | | |
|---|---|---|
| *H02J 3/24* | (2006.01) | |
| *H02J 3/18* | (2006.01) | |
| *G05B 19/042* | (2006.01) | |
| *H02J 3/28* | (2006.01) | |

(52) U.S. Cl.
CPC ............. *H02J 3/24* (2013.01); *G05B 19/042* (2013.01); *H02J 3/1835* (2013.01); *H02J 3/28* (2013.01); *G05B 2219/2639* (2013.01)

(58) Field of Classification Search
CPC .... H02J 3/24; H02J 3/1835; H02J 3/28; H02J 3/1814; H02J 2203/10; H02J 3/20; H02J 13/00004; H02J 13/0004; H02J 3/00125; G05B 19/042; G05B 2219/2639; Y02B 90/20; Y02E 40/10; Y02E 40/30; Y02E 40/70; Y04S 10/22; Y04S 20/00

See application file for complete search history.

(56) References Cited

U.S. PATENT DOCUMENTS

| | | | | |
|---|---|---|---|---|
| 5,166,597 | A * | 11/1992 | Larsen | G05F 1/20 323/215 |
| 5,198,746 | A * | 3/1993 | Gyugyi | H02J 3/1814 363/39 |
| 5,227,713 | A * | 7/1993 | Bowler | H02P 13/06 323/210 |
| 5,642,007 | A * | 6/1997 | Gyugyi | H02J 3/24 323/207 |
| 5,698,969 | A * | 12/1997 | Gyugyi | H02J 3/1814 323/215 |
| 2008/0310069 | A1* | 12/2008 | Divan | H02J 3/1807 361/93.9 |
| 2011/0012583 | A1* | 1/2011 | Hyde | G05F 1/14 323/355 |
| 2014/0055163 | A1* | 2/2014 | Song | G06F 1/32 326/63 |
| 2017/0237255 | A1* | 8/2017 | Inam | H02J 3/06 700/295 |

* cited by examiner

*Primary Examiner* — Ziaul Karim
(74) *Attorney, Agent, or Firm* — Womble Bond Dickinson (US) LLP

(57) ABSTRACT

An intelligent impedance injection module is for use with transmission lines in a power grid. The intelligent impedance injection module has a plurality of transformer-less impedance injector units and a controller. The controller changes injector gain of the impedance injector units to compensate for current swings in a transmission line.

19 Claims, 8 Drawing Sheets

Generation Capacity

Load

Intelligent distributed impedance injection modules (CDIIMs) that are Dynamic Response Capable Normal Communication Link High-Speed Communication Link Localized Intelligence Centers

FAST-SLOW INJECTION FOR RECOVERY FROM TRANSIENT RESPONSE AND VOLTAGE COLLAPSE WITH AVOIDANCE OF SSR AND SSCI

CROSS-REFERENCE TO RELATED APPLICATIONS

This application claims benefit of priority from U.S. Provisional Application No. 62/860,159 filed Jun. 11, 2019, which is incorporated herein by reference in its entirety.

TECHNICAL FIELD

The present disclosure relates to using available resources from the transformer-less flexible alternating current transmission system (TL-FACTS) based impedance injection modules (IIMs) having one or more impedance injector units (IIUs) used to generate and inject impedance on to the high voltage (HV) transmission lines for optimized power transfer and line balancing and to provide a capability to manage un-expected disturbances and power fluctuations on the HV-transmission line and the power grid.

BACKGROUND OF INVENTION

The current trend in the industry is to use modular TL-FACTS based impedance injection units with built in intelligence for localized control in addition to utility-based control of power flow over the HV transmission lines. A plurality of intelligent impedance injection units is combined as impedance injection modules (IIMs) that are coupled to the power line. The built-in intelligence in these IIMs enable them to identify problems and provide local responses to changes in power flow over the transmission lines. FIG. 1 shows such an implementation.

An example of such system is shown in FIG. 1. System 100 includes distributed impedance injection modules (IIMs) 301 distributed over HV transmission lines 108 between substations 204. The IIMs 301 are directly attached to the HV transmission lines 108 of the power grid that are suspended insulated from ground on HV towers 201. Generators 203 and loads 205 are typically connected to the HV transmission lines 108 of the power grid at the substations 204. The IIMs 301 are communicatively connected or coupled to local intelligence centers (LINCs) 302 via high-speed communication links 303 that allow for communication and reaction by the IIMs 301 in the local area at sub synchronous speeds when required. The LINCs 302 are also connected by high-speed communication links 303 to other LINCs 302 for coordination of activity of the local IIMs 301 groups. A supervisory utility 206 oversees the activity of the system 300 using command and communication links 207 connecting to the LINCs 302 and substations 204. The supervisory utility 206 is able to have interactive control of the local IIMs 301 via the communication links 305 connecting it to the LINCs 302. FIG. 2 is a block diagram showing the main components of an intelligent IIM 301. Referring to FIG. 2, IIM 301 includes at least an impedance generation and injection module 102, an intelligent control capability 402 with at least a clock with time synchronization capability, and a high-speed communication link 303.

SUMMARY

One embodiment of an intelligent impedance injection module, for use with transmission lines in a power grid, has a plurality of transformer-less impedance injector units (IIUs) and a controller. The controller is to change injector gain of the IIUs to compensate for power swings in a transmission line.

One embodiment of an intelligent impedance injection module, for use with transmission lines in a power grid, has a plurality of transformer-less impedance injector units (IIUs) and a controller. The controller is to change the injector gain of the IIUs to a first high gain for initial response to a detected anomaly in a transmission line. The controller is further to change the injector gain of the IIUs to a lower, second gain after a specified time. The change to the second gain may be a step function change or a dynamic and continuous change to reduce any disturbance being injected on to the transmission line due to the change.

One embodiment is a method of impedance injection for a transmission line in a power grid. The method is performed by an intelligent impedance injection module (IIM). The IIM is coupled to the transmission line. The intelligent impedance injection module sets injector gain of a plurality of transformer-less impedance injector units (IIUs) of the IIM to a first, higher gain state for initial response to any sudden power transfer change incident over the transmission line. The intelligent impedance injection module changes the injector gain of the IIUs to a lower, second gain state after a pre-set time. The change to the lower gain may be a relatively dynamic and continuous change to prevent any disturbance being injected on the power line.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
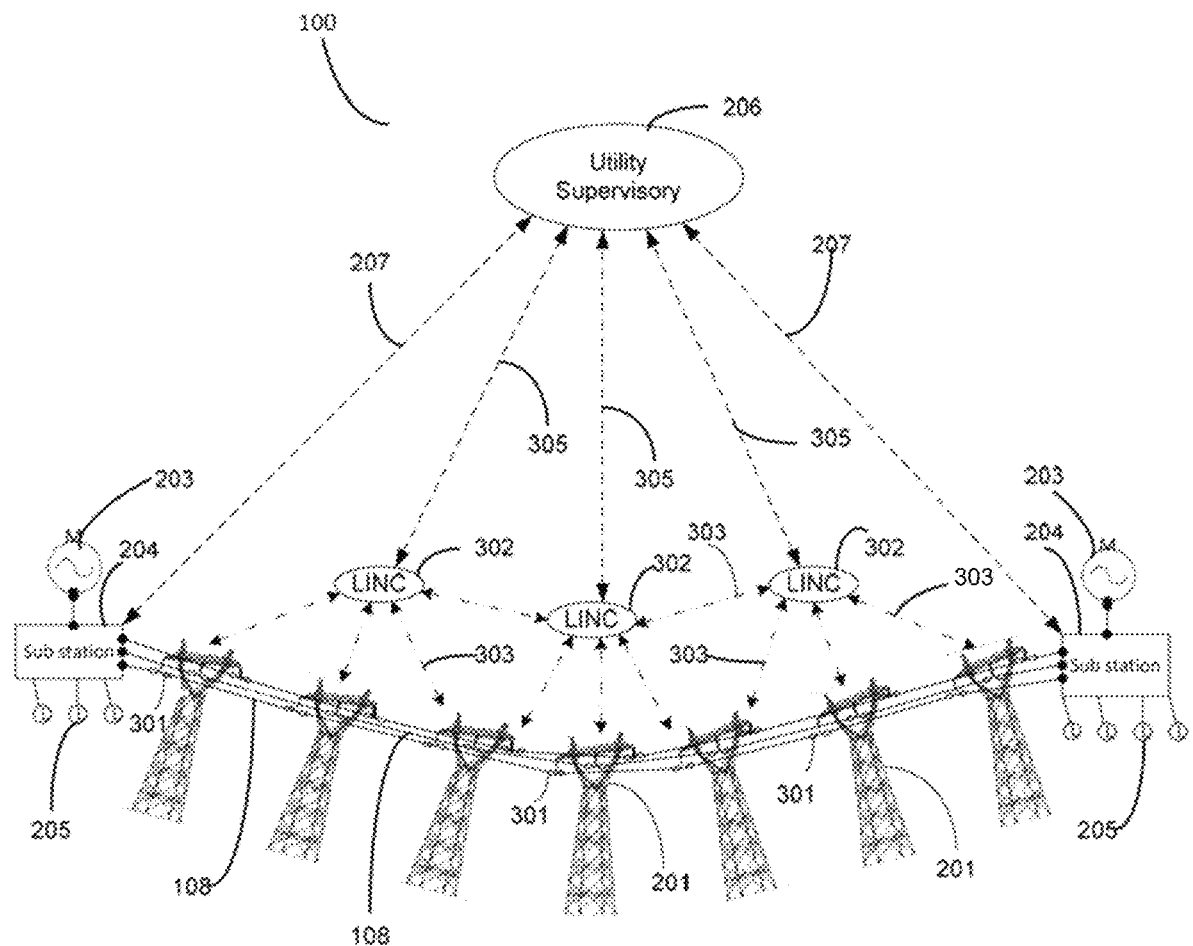
FIG. 1 is a block diagram illustrating conventional distributed impedance injection modules (IIMs) attached directly to an HV transmission line with intelligent local control and utility-based control capabilities.
Figure 1:
Figure 1:
Figure 1:
Figure 1:
Figure 1:
Figure 1:
Figure 2:
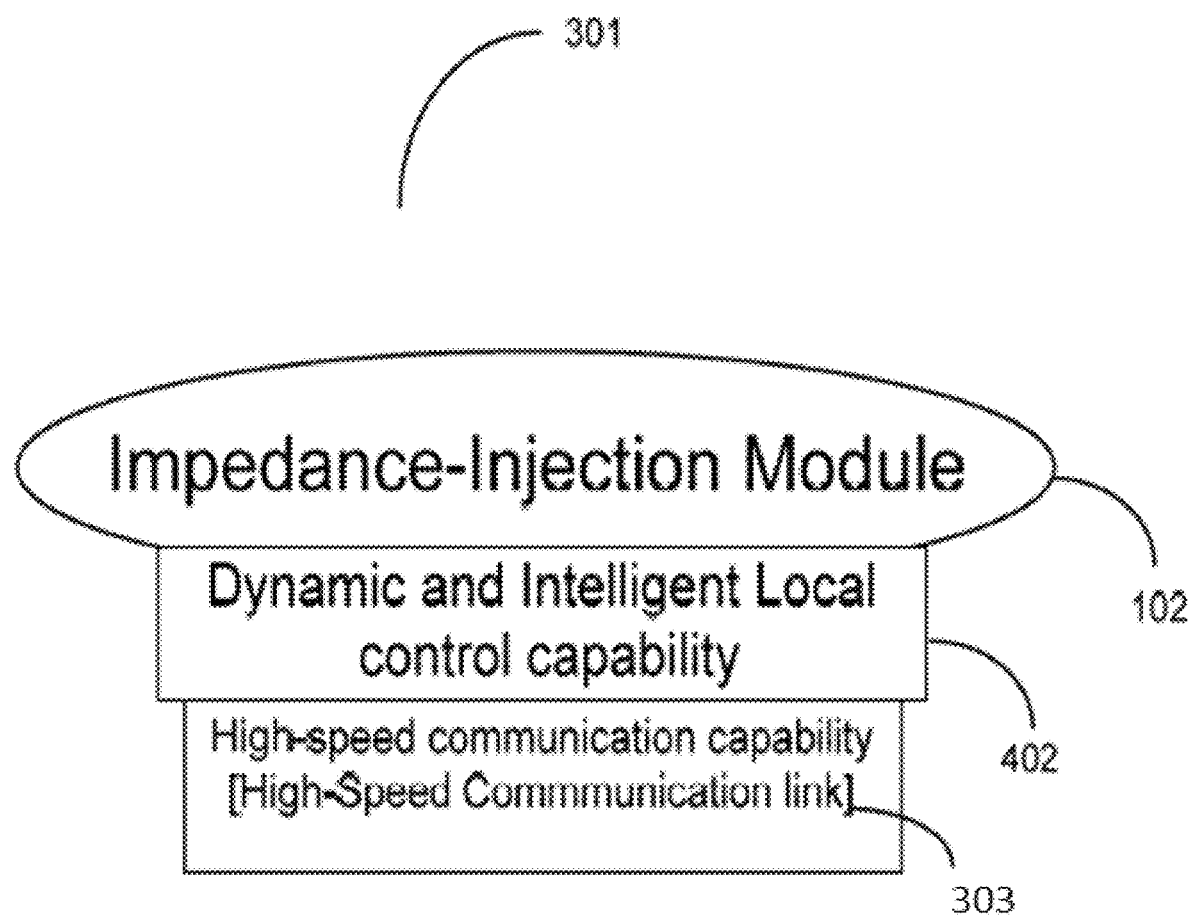
FIG. 2 is a block diagram illustrating a conventional distributed dynamic intelligent impedance injection module with local and global time synchronization capability.

Current trend in the industry is to use intelligent injection modules (IIMs) comprising series-parallel connected TL- FACTS devices for line balancing and interactive-control of High-Voltage (HV) Power lines. The TL-FACTS devices of the impedance injection units (IIUs) of the IIMs generate and inject capacitive or inductive waveforms in an intelligent fashion based on the corrective action needed. During normal operation the generation and injection of the impedance for power flow correction is done reasonably slowly over a number of seconds. In the stable condition the power generation and the power utilization over the grid is matched. But when a sudden change to the power flow over the transmission line happens due to any reason, that includes for example, a generator or a line trip, a line or a load switch, or any other type of fault at the generator or on the transmission line, the grid or the transmission line can becomes unstable. It should be noted that the general term "fault" can be used to cover the group comprising the generator or the line trip, the line or the load switch, or any other type of fault at the generator or on the transmission line, At this time there is a need to have a very fast injection response to such a change in power transfer mismatch between the load and the generator to prevent system instability expanding. Such instability maybe in the form of oscillations, Voltage collapse, or other transient stability problems. This fast response is accomplished by changing the gain setting of the IIUs to a high gain state which is then reset to the lower state after a pre-set period ($t_{delta}$), or a determination of stabilization of power transfer over the transmission lines, to prevent SSR, SSCI or other oscillation problems.

In some embodiments, the use of distributed self-aware and intelligent impedance injection modules (IIMs) with a plurality of Transformer-less impedance injector units connected in series-parallel configuration provide the capability to selectively change injector gains to compensate for load or generator power swings due to line switching, or line faults, or generator trip or faults that exceed a preset threshold.

In some embodiments, the use of distributed self-aware and intelligent impedance injection modules (IIMs) with a plurality of Transformer-less impedance injector units connected in series-parallel configuration provide the capability to selectively change injector gains to compensate for any power swings that can create instability to the grid during re-energizing the HV transmission line after correction of the cause of the incident causing the power swing.

In some embodiments, local intelligent controllers in the IIMs are able to change the gain of the impedance injector units (IIUs) for a short-preset period of time ($t_{delta}$) to a high gain state for fast response and re-set it to normal lower gain state after the pre-set time to prevent the grid system experiencing oscillations induced by the fast rise and fall times of the injected impedance.

In some embodiments, the method of injecting impedance using high gain setting of impedance injector units (IIU) on to the HV power lines during a sensed power swing incident during a fault reset or immediately following the detection of a significant increase or decrease in line power, and the timed reset of the gain to normal value after a pre-set period in the IIUs to prevent buildup of oscillations in the grid system once the line power swing has settled.

Figure 3:
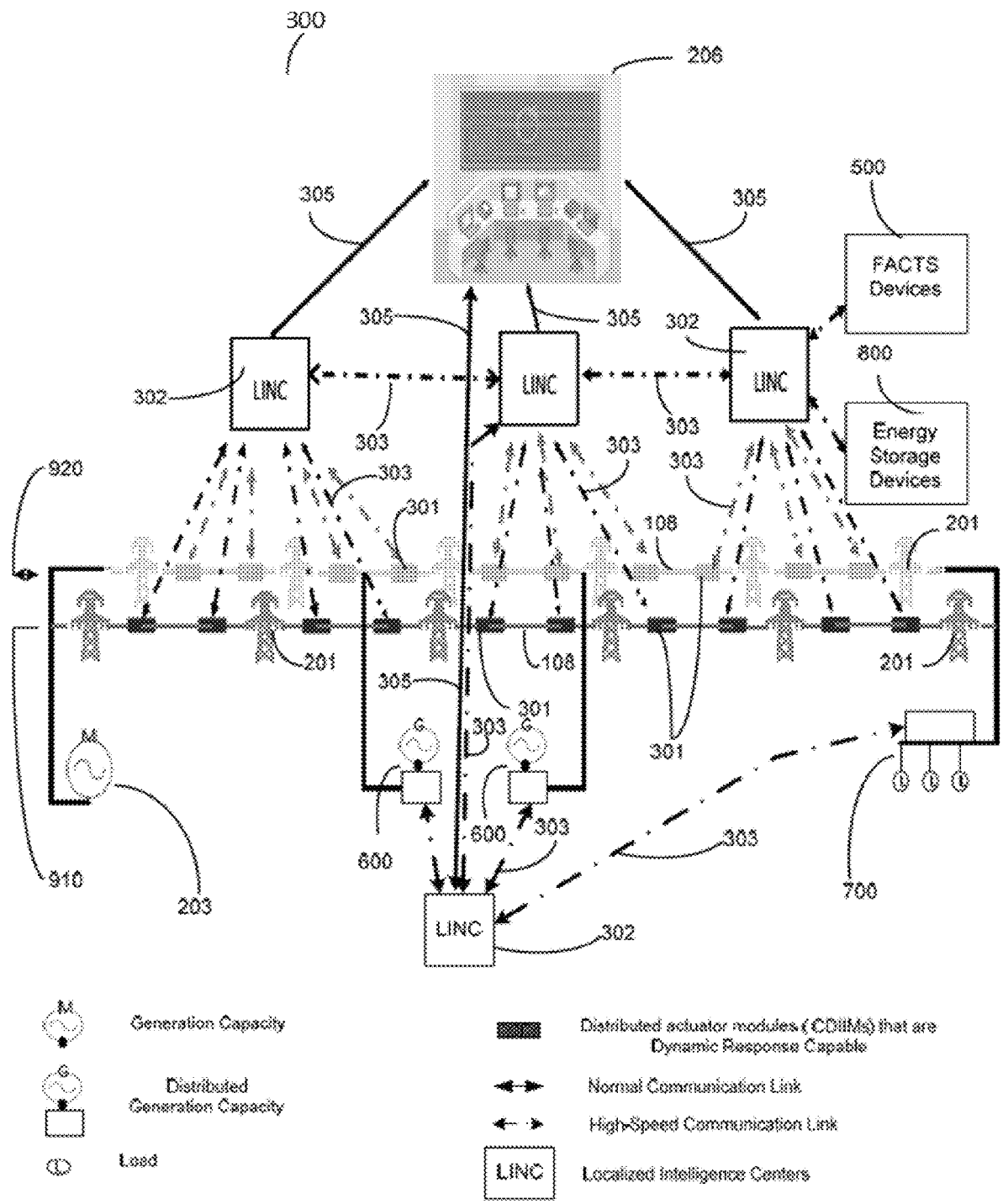
FIG. 3 is a block schematic 300 of the total power system according to one embodiment.

FIG. 3 is a block schematic of a total power system according to one embodiment, with two HV power grids 910 and 920 and associated distributed impedance injection modules 301. Actuator devices 500 that are enabled with distributed standardized control and communication capabilities. In one embodiment, the capabilities established for sub-cyclic control and appropriate communication for all the distributed impedance injection modules 301 are used. Actuator devices 500 and the miscellaneous FACTS-coupled devices, such as distributed generators 600, energy storage devices 800 etc. that are inside, at the edge and outside the edge of the power grid 300 to provide a distributed but integrated sub-cyclic control and response capability to the total power system 300. These enable optimization of the operation of the total power system 300 from generation to distribution. In one embodiment, CDIIM 301, LINCs 302, actuator devices 500, energy storage devices 800, and the distributed generation capabilities 600, as well as the distributed loads 700, are all with control capability that is typically FACTS-based and are interconnected locally using the high-speed communication capability 303 provided by the high-speed communication links 303 associated with each of the devices as shown. This communication capability is provided through the nearest LINC 302, shown in FIG. 3, for localized communication and control supervision. The LINCs 302 are also interconnected with high-speed link connections 303 for high-speed inter-LINC communication between the neighboring local areas. The LINCs 302 are further connected to the utility supervisory 206 using communication connections 305 which may be slower than the high-speed connection links 303, to enable data transfer and overall supervisory control of the total power system.

The control and communication capabilities of the total power system 300, implemented within, at the edge and outside the edge of power grid are integrated using typically the FACTS-based control, and high-speed communication at each of the actuator modules, other actuator devices and miscellaneous FACTS-coupled actuator devices, and covers the total power system from generation to distribution. Such a system can provide optimized, dynamic, localized control of power flows from generators to loads by adjusting the generation outputs and line currents of the HV transmission grid based on system constraints and load requirements. The high-speed communication capabilities linking the IIM 301, LINCs 302, with the FACTS-coupled generators 600, loads 700, other actuator devices 500, and FACTS-coupled energy storage devices 800 provide a system-level capability for localized, intelligent and capable of sub-cyclic control of all connected subsystems and devices within the total power system 300.

Figure 4:
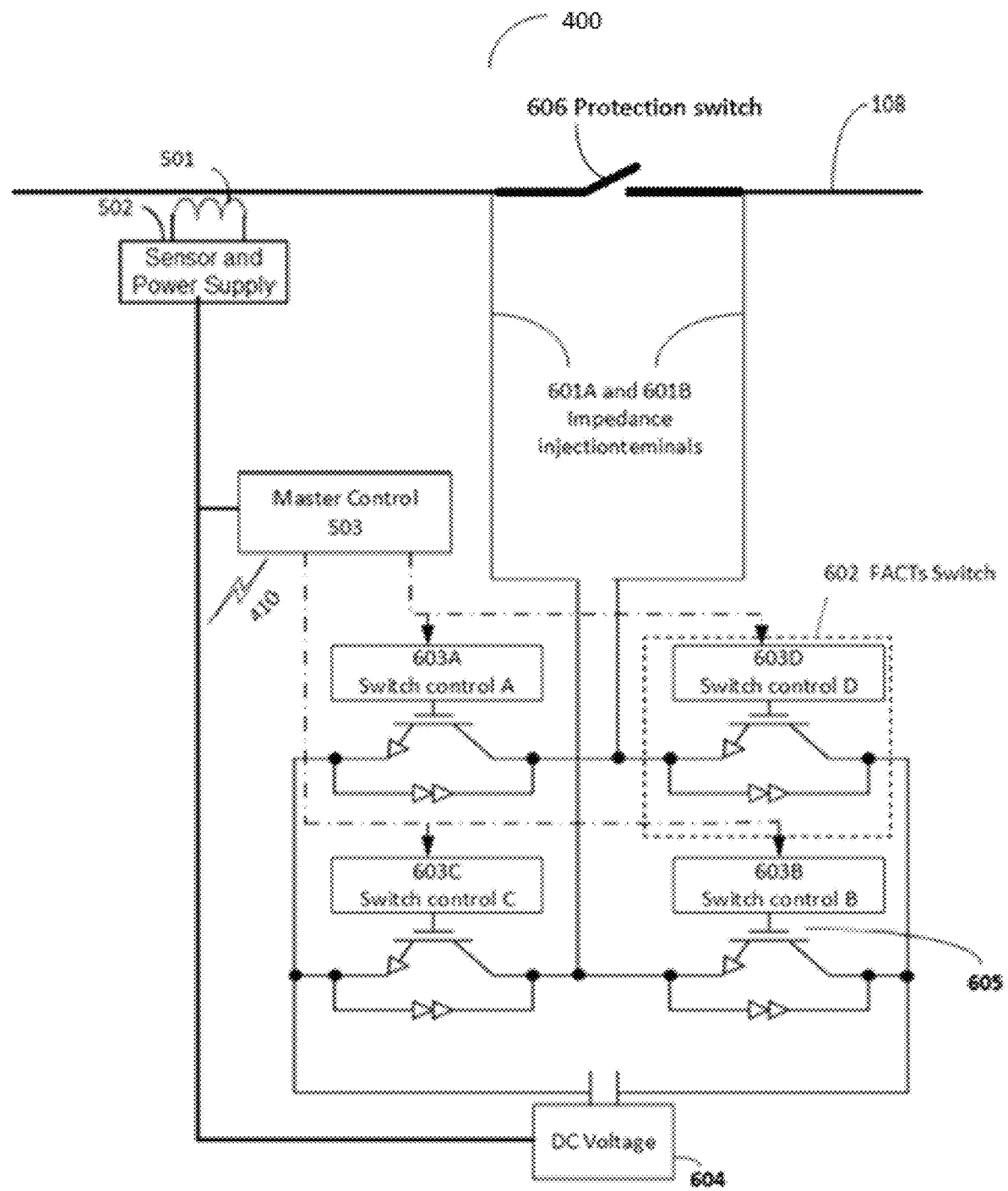
FIG. 4 is a block diagram of an IIU as a power flow control subsystem having four TL-FACTS based switch units.
Figure 5:
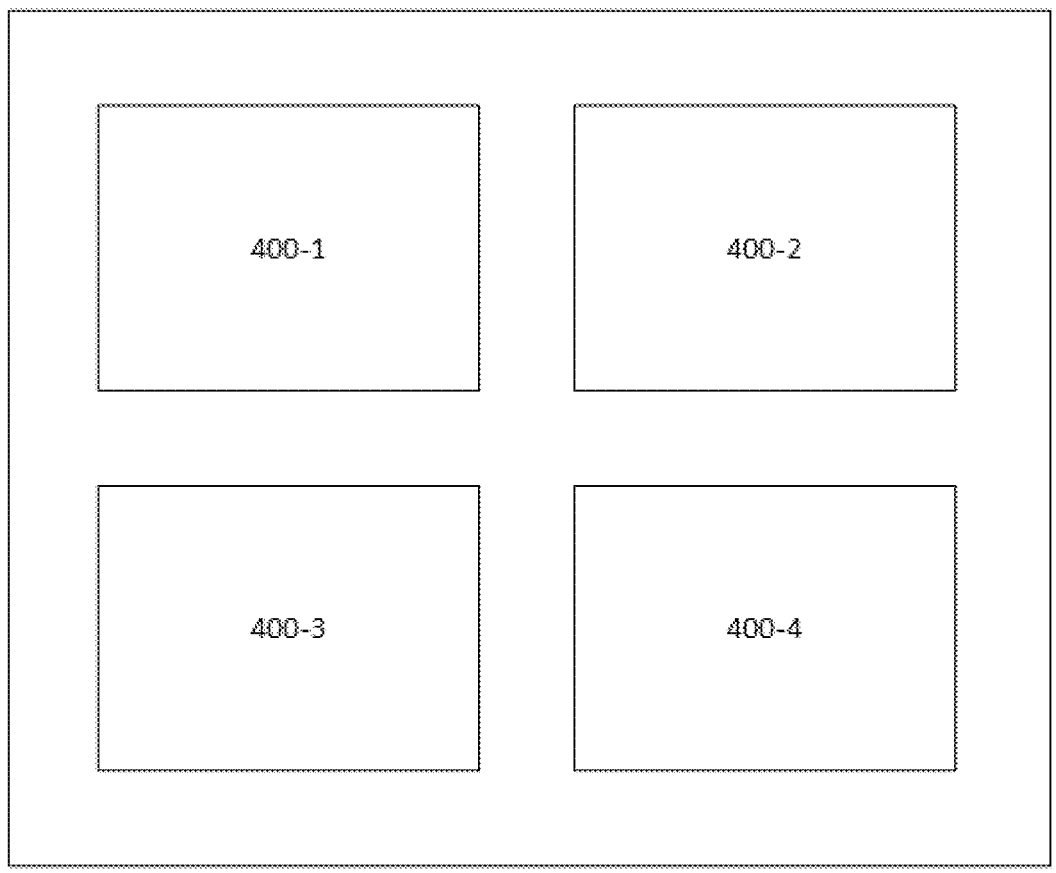
FIG. 5 is a diagram of interconnected in a 2×2 matrix of IIUs forming an IIM.

Recently, TL-FACTSs that are lower in weight and cost have also been developed and implemented as IIUs for line balancing and control. An example of such a TL-FACTS-based IIU 400 is shown in FIG. 4. The TL-FACTS-based IIU 400 is powered by power that is extracted from the HV transmission line 108 via the secondary transformer 501 connected to the sensor and power supply block 502, and provided to the DC power source 604. Having DC power source 604 across the capacitor helps to improve the generation of the injected impedance across terminals 601A-B and optimize the impedance injection onto the HV transmission line 108. A local master control 503 is enabled with intelligence to respond to the power line disturbances and imbalances sensed by the sensor and power supply module 502 coupled to the power line 108. The master local control 503 also has a local clock therein which is synchronizable with external clocks. The master local control 503 of each IIU 400 has high-speed wireless linkage or interface 410 connecting to the neighboring IIUs 400. A single or a group of IIUs 400 connected in a series-parallel configuration can make up each IIM 301, an example of which with a 2×2 connection is shown in FIG. 5. The master local controls 503 of these connected IIUs are slaved to a selected one of the master local controls 503 which act as the interface to the other IIMs 301 and the LINCs 302. In a system with IIMs 301 distributed over the HV power lines, the IIMs 301 connect to the LINCs 302 via the high-speed communication links 303 (as previously described). These high-speed communication links 303 are used to provide the switching control and in some instances synchronization signals to the master local control 503 which in turn provide the necessary control instructions to the switch control blocks 603A-D of FACTS switches 602 where each FACTS switch 602 includes a control block (e.g., control blocks 603A-D) and FACTS device 605. FACTS device 605 includes a switching device (e.g., bipolar junction transistor (BJT), field-effect transistor (FET), metal-oxide-semiconductor field-effect transistor (MOSFET), or the like). Based on the switching control signals from master local control 503, each of the switch control blocks 603A-D controls its respective FACTS device 605, typically FACTS switches using insulated gate bipolar devices (IGBT)s, which in turn controls impedance injection terminals 601A-B that are connected in series across the HV transmission line 108. The TL-FACTS-based IIU 400, due to its low weight, allows a number of them to be connected or coupled to the HV transmission lines 108 and operate in a series-parallel mode. A single or a plurality of interconnected TL-FACTS-based IIU 400 may form a single IIM 300 that is connected directly to the high voltage power lines 108 and operates with a pseudo-ground at the HV powerline voltage. A protection switch 606 (i.e., open/close) is provided that is used to close and short the impedance injection terminals 601A-B during fault conditions on the HV transmission line 108 and hence to bypass the circuits of the TL-FACTS-based IIU 400 included in the distributed IIM 301 and protect the FACTS devices and control circuit from damage and failure.

Figure 6:
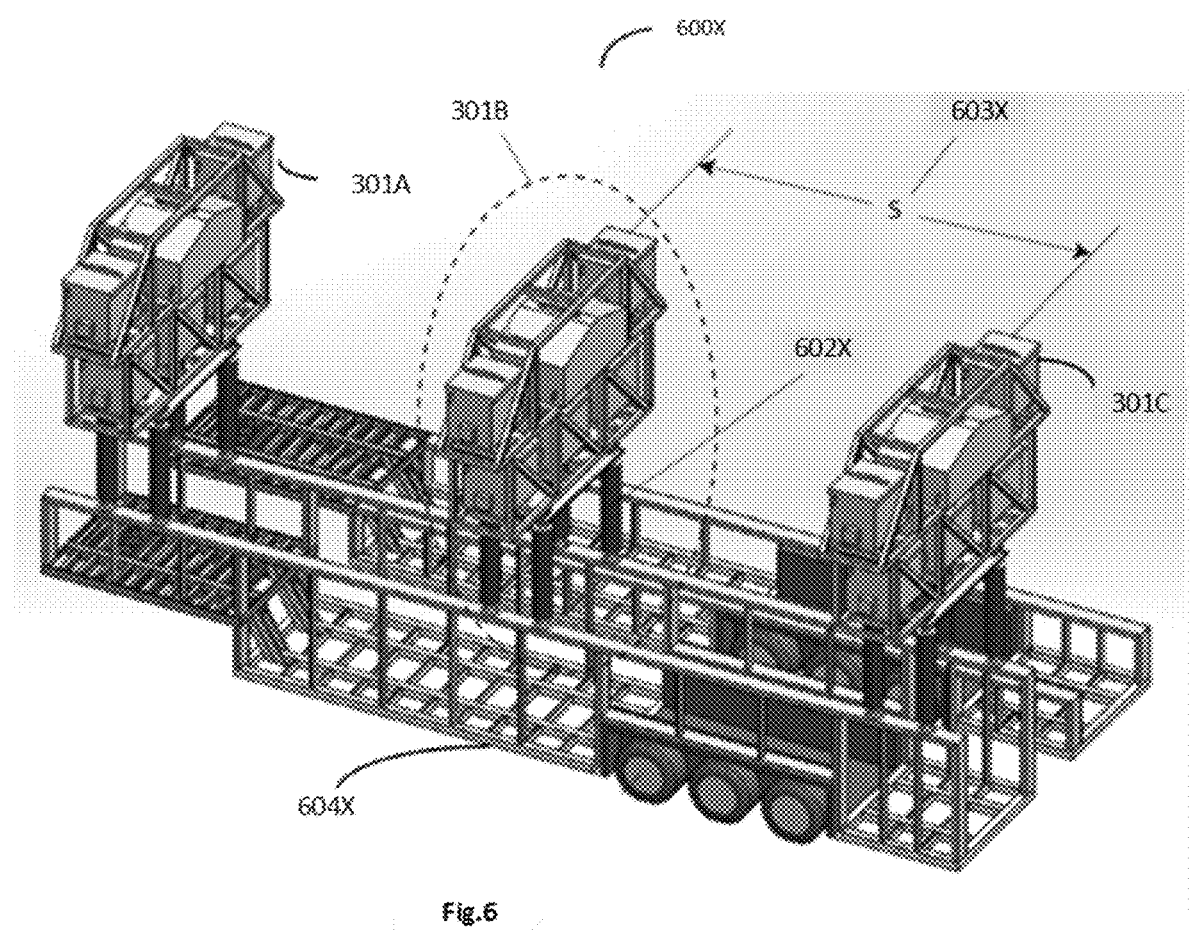
FIG. 6 is an is a diagram 600X of a mobile platform having three IIMs as power flow control subsystems for the three high-voltage lines of a power grid.

Though the IIMs 301 are typically distributed over the HV power lines 108, they can also be configured to be transported on mobile carriers as needed to locations or configured to be used at substations as needed. An example mobile implementation 600X of three IIMs 301 for coupling to the three phases of the HV Transmission lines is shown in FIG. 6. FIG. 6 shows the three IIMs 301 A, B and C separated by a distance 603X from each other as insulation. The three IIMs 301 A, B and C are installed on a mobile carrier 604X on insulated stand-offs 602X.

Figure 7:
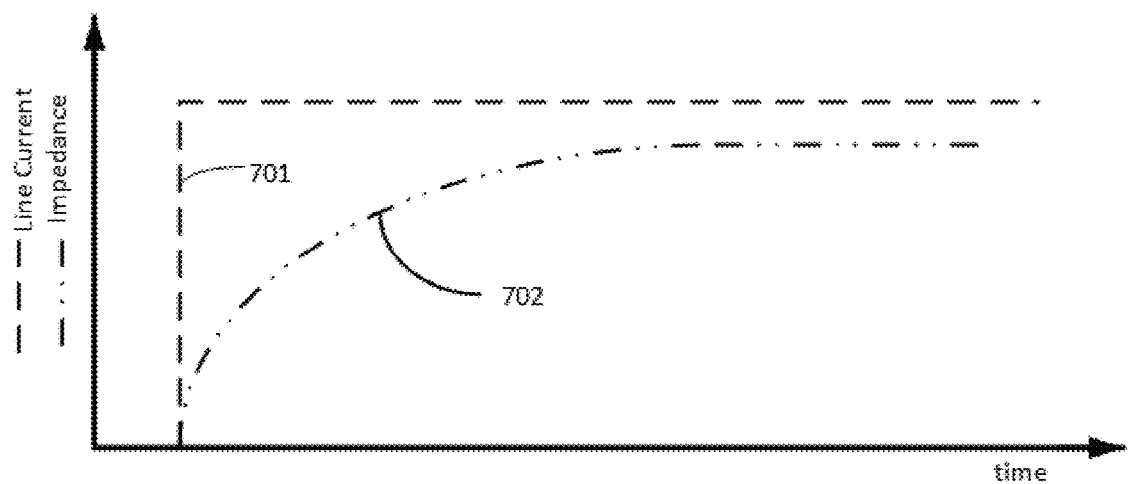
FIG. 7 is a diagram of normal impedance injection with a low gain setting of the IIUs of the IIMs for generation and injection of impedance as a sinusoidal input on to the HV transmission line.

In all these cases the IIMs are configured to be used for power flow control and control of disturbances on the lines by injecting impedances to compensate for changes. These control applications operate with the IIUs 400 of the IIMs 301s to operate with low gain setting and at a response rate wherein the control is applied over a number of seconds. Under normal operating conditions the gain of the IIUs 400 are kept low as shown in FIG. 7. The IIUs 400 of the IIMs 301 inject impedance waveforms which are then combined in a timed fashion to generate a Sinusoidal waveform injected on the HV power lines. The use of smooth rising injection waveform 702 is needed to reduce or eliminate unwanted sub synchronous resonance (SSR), unstable Sub Synchronous Control Interactions (SSCI) related oscillations as well as generation and propagation of other harmonic oscillations over the grid system.

This type of implementation of control of IIUs 400 of the IIMs 301 for impedance injection has been found ineffective in addressing certain problems on the grid system that are adversely impacted by sudden large changes in network power flow.

As shown in FIG. 3 in most grid systems multiple HV transmission line sets such as 910 and 920 carrying the three phases of load are used to connect main power generation location having multiple generators 203 to the user loads 700. For the case that large quantities of power are being transmitted from one area to another, technical constraints aside from the thermal capability of the transmission lines can limit the amount of power that can be transmitted along said transmission lines. The power transfer capability can sometimes be limited by voltage collapse or transient stability problems. When these problems exist and are related to high transfer of power along transmission lines, a reduction of the series line impedance can reduce the severity of the problem and allow larger amounts of power to be transmitted on the lines.

Voltage collapse is the phenomena where an uncontrolled and significant reduction in system voltage occurs due to the reactive power requirements of the network and connected loads not being met. This may be triggered by growth of load, loss of generation, loss of line, loss of supporting reactive plant, all of which increase the reactive power demands of the system. If left uncorrected this can have a domino effect even leading to grid system collapse.

Transient stability is related to the ability of power system to return to a stable state, remaining intact and maintaining synchronism between generators following a large disturbance on the grid such as a line fault and trip, or loss of a significant plant item. When a large disturbance occurs, angular power swings may occur as some generators accelerate and other generators decelerate due to an imbalance of generation and load in different parts of the interconnected network. Excessive angular swing between generators can lead to transient instability of the network, resulting in generator pole slipping, and potential system separation and loss of load.

As an example if a fault happens on the HV transmission line group 901, the short circuit current will cause the current flow in that line to increase by pulling the current from the HV transmission line group 902 starving the load till the safety trips operate opening up the faulty group. At that point the current in the second HV transmission line group will suddenly increase to satisfy the load. The increased electrical current in the remaining in-service line creates increased reactive power losses (known as 'I-squared X' losses) in the line that can result in exaggerated voltage drop and risk of voltage collapse. Similar scenario can also happen if one or more generators experience faults resulting in them going off line. This can cause a sudden increase in power transferred over the HV transmission line groups leading to increased reactive power consumption and potential for voltage collapse. Using the capacitive injection capability of the IIMs, the series reactance of the transmission line can be decreased, which reduces reactive losses in the line and improves voltage levels on the system, preventing voltage collapse.

Where large quantities of power are being transferred from one area to another, a fault and loss of a line will result in large current flows on alternative parallel transmission paths. The step change in line load can create angular power swings between generators in the two different areas. If the amount of power being transferred along the transmission lines exceeded a certain level, the power swings can be large enough to cause transient instability on the system, which can lead to system separation, loss of generation, and loss of load. Using the capacitive injection capability of the IMMs, the series reactance of the remaining in-service lines can be reduced, which in turn reduces the power angle across the line required to allow a certain level of power to flow on the line, thereby avoiding transient system instability.

In both cases described above, the use of capacitive injection on the lines to reduce their series impedance, reducing reactive power losses or reducing the power angle along the line can increase the level of power that can safely be transmitted along the lines. However, the response of the IIMs to inject a voltage waveform to create a capacitive injection needs to be at a much faster and higher rate to address the voltage and transient stability issues. A response time of only a few cycles with high injection rate can be used to provide maximum benefits to the grid.

Figure 8:
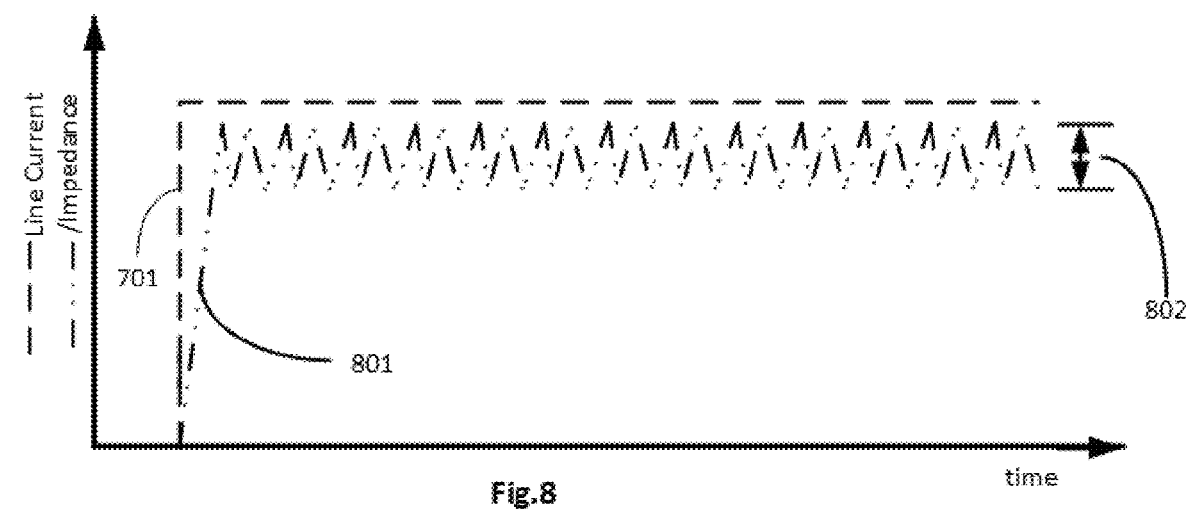
FIG. 8 is a diagram showing a high gain setting allowing the IIUs of the IIMs to inject cumulative square wave impedance on to the HV Transmission line on identification of large change in load current.

The present disclosure addresses the need for control to be available for sudden large supply current or load changes 701 in non-faulty lines, as well as lines being re-energized after a trip. By increasing the intelligence and sensors built into the control modules within the IIMs 301 they are able to recognize when large load current swings happen. The capability of IIUs 400 of the IIMs 301 capable of injecting impedance are then changed such that their gain is increased. The increase in gain allows the IIUs 400 to respond rapidly injecting fast rising 801 pulses into the HV grid lines as shown in FIG. 8 to compensate for large load changes 701 which improves the voltage collapse and transient stability conditions of the grid, allowing large level of power to be safely transmitted across the network.

Figure 9:
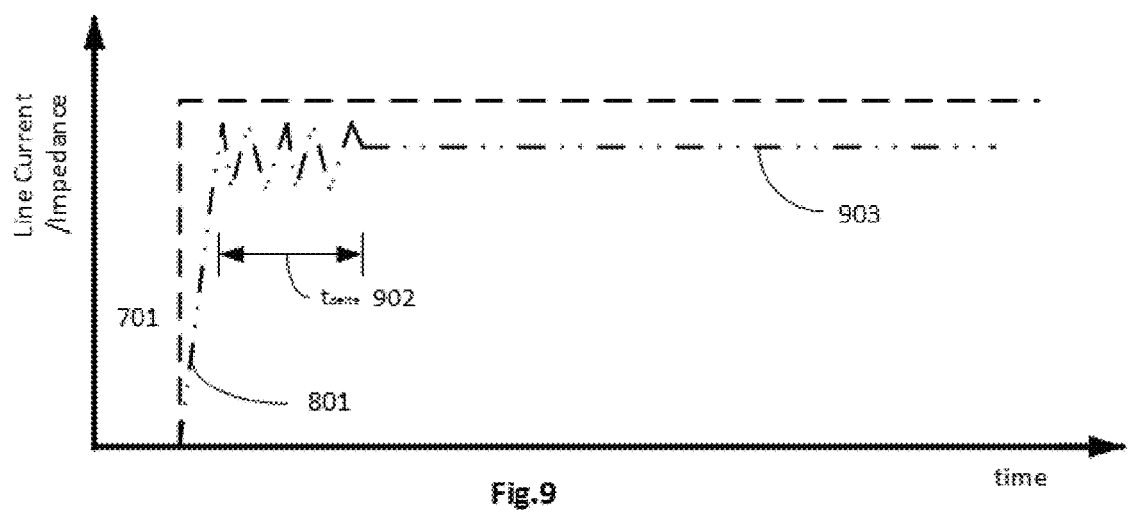
FIG. 9 is a diagram showing a principle of operation where the gain of the IIUs are increased on recognition of a large change in load current for a short pre-defined duration to provide response to the change while limiting or damping any oscillations after the set duration by reverting to normal low gain condition for the IIUs.

The problem of high gain that enable the injection of cumulative large fast rising 801 pulses instead of smooth rising 702 pulses to correct large swings in line current 701 is that oscillations 802 can be generated and propagated over the HV transmission lines. These oscillations can be due to SSR and SSCI as well as harmonics generated by the fast-rising impedance injection. In order to prevent such a problem over long normal operation, it is proposed to limit the time to a value $t_{delta}$ 902, for which the high gain of the IIUs 400 are sustained, as shown in FIG. 9. This embodiment allows the IIUs 400 to enter the high gain state enabling a fast rise 801 of impedance injection on recognition of high load swings 701 for a pre-determined time required for verification of fault. After such period 902 the gain of the IIUs 400 injecting the impedance onto the line is set back to its normal low value. Such a method of controlling the impedance injection response allow the grid system to respond efficiently to large load current swings 701 while keeping the propensity for sustained oscillations 802 low.

Figure 10:
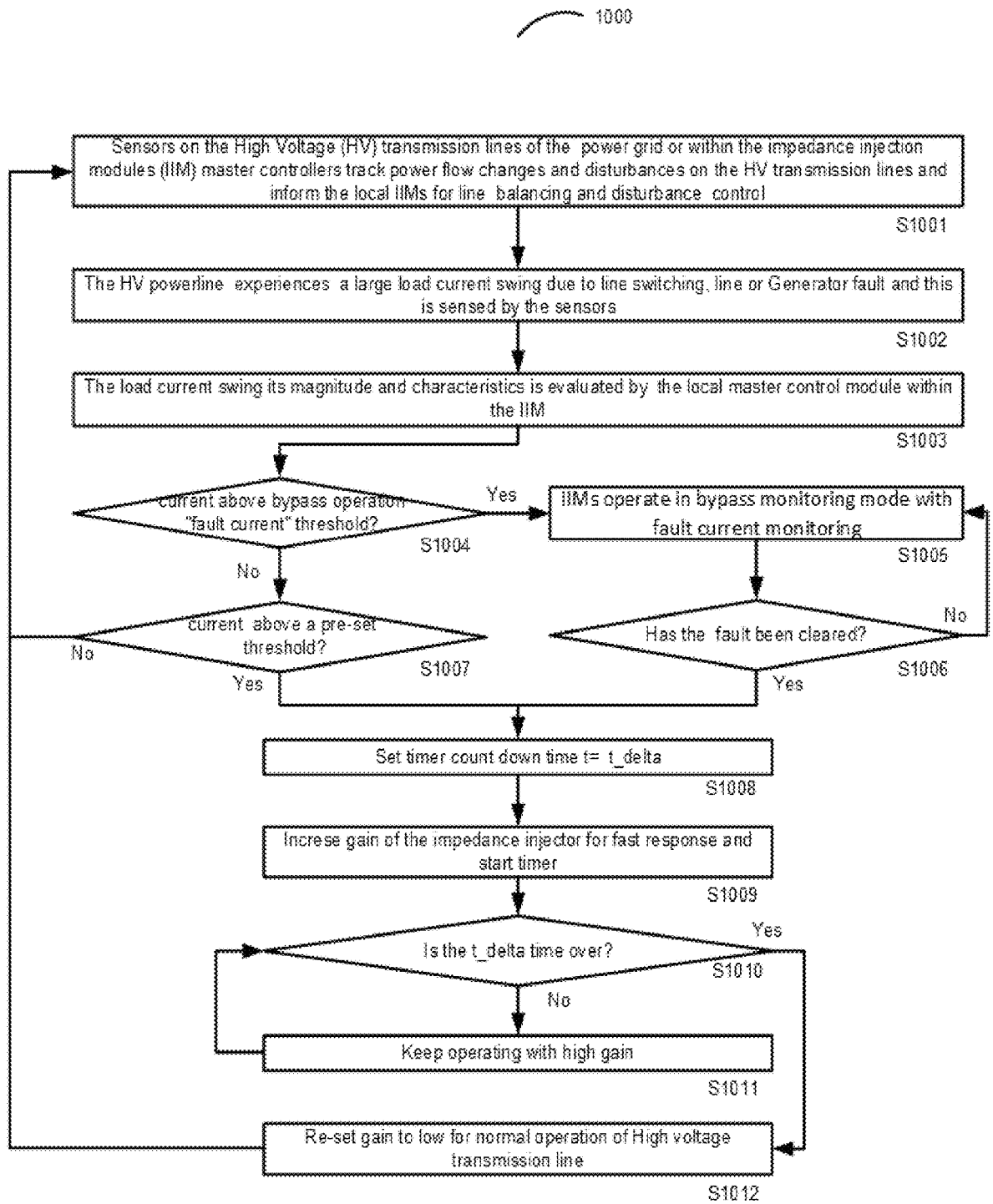
FIG. 10 is a flow chart according to one embodiment.

FIG. 10 shows a flow chart of such method.

During normal operation of the grid system the gain of the impedance injector circuits are set to low to reduce any propensity for oscillations on the HV transmission lines of the grid. Sensors coupled to the HV power lines of the grid system operate to sense any changes in power flow over the grid and or disturbances and any deviations to flow are informed to the master controllers in the local IIMs and to the utility. The local IIMs comprising one or more interconnected FACTS-based IIUs using the intelligence built in or on communicated commands, e.g., from a utility, respond to the sensed information by injecting impedances to balance the power flow and keep the grid system in balance. S1001

When a large power swing due to line switching, line fault or generator fault happens, that change is sensed by the sensors coupled to the HV transmission lines. S1002.

High power swing information is also communicated to the master control in the local IIMs, the LINCs and the system utility over available communication links. The master controller of the IIM evaluates the received information. S1003

The master controller at the IIM checks the information to see if the power swing exceeds a "fault" threshold setting of power deviation that requires the IIMs to be put in a by-pass mode to prevent damage. S1004.

If the power swing exceeded the by-pass "fault" threshold the IIMs enter the by-pass mode and are taken off line but retaining the capability for continuous "fault" monitoring and communication. S1005.

The IIMs continuously monitor the HV transmission line and received communication to see if the fault has been cleared and the HV transmission line is operational. As long as the fault remains the IIMs remain in the by-pass mode. S1006.

If the power swing does not exceed the by-pass "fault" threshold at S1004, the power swing is checked against a pre-set threshold over which system instabilities can happen. If the power swing does not exceed this pre-set threshold value the system goes back to normal operation. S1007.

If the preset threshold is exceeded in S1007 or if the fault is cleared and the line is re-energized in S1006, then the master controller in the IIMs sends out a command to all associated IIMs in the local area to start countdown timers slaved and synchronized to a master timer, with a pre-set time value $t=t_{delta}$. S1008

Simultaneous to setting the countdown timers, the countdown is started and the command is sent to the IIMs in the local area to increase the injector gain setting of the IIUs and engage on the HV transmission line injecting impedance on to the HV transmission lines for the timer pre-set period of $t_{delta}$ as required by one embodiment. This results in the gain of all IIUs acting as impedance injectors to be increased to compensate for the high power swing, resulting in a faster impedance injection response with steeper rise time. S1009.

The count-down timer is checked to see if the $t_{delta}$ time has elapsed. S1010. If the result of the check is negative the gain of the impedance injectors is kept high as at S 1009 while checking of elapse time $t_{delta}$ is repeated. S1011

If the result of the check at S1009 is positive and the time $t_{delta}$ has elapsed, them the master controller sends out a command to all the IIMs under local control to reset the impedance injector gain to normal operating value (low). The operation of the HV transmission line group without fault are returned to normal operation S1012.

Even though various embodiments disclosed are described using specific implementations as examples, the present disclosure is intended only to be exemplary and non-limiting. The practitioners of the art will be able to understand and modify the same based on new innovations and concepts, as they are made and become available. The claims are intended to encompass these modifications that conform to the inventive ideas discussed.

In some embodiments, the use of distributed self-aware and intelligent impedance injection modules (IIMs) with a plurality of Transformer-less impedance injector units connected in series-parallel configuration provide the capability to selectively change injector gains to compensate for load current swings due to line switching, or line faults, or generator faults that exceed a preset threshold.

In some embodiments, the use of distributed self-aware and intelligent impedance injection modules (IIMs) with a plurality of Transformer-less impedance injector units connected in series-parallel configuration provide the capability to selectively change injector gains to compensate for current swings that can create instability during re-energizing the HV transmission line after a fault related incident In some embodiments, local intelligent controllers in the IIMs are able to change the gain of the impedance injector units (IIUs) for a short-preset period of time ($t_{delta}$) to a high gain state for fast response and re-set it to normal lower gain state after the pre-set time to prevent the grid system experiencing oscillations induced by the fast rise and fall times of the injected impedance.

In some embodiments, the method of injecting impedance using high gain setting of impedance injector units (IIU) on to the HV power lines during a sensed high power change incident during a fault reset or immediately following the detection of a significant increase or decrease in power transfer, and the timed reset of the gain to normal value after a pre-set period in the IIUs to prevent buildup of oscillations in the grid system once the line power change has settled.

What is claimed is:

1. An intelligent impedance injection module (IIM) for use with transmission lines in a power grid, the intelligent IIM comprising:
   a plurality of transformer-less impedance injection units (IIUs); and
   a controller, to change injection gain of the plurality of IIUs to compensate for power swings, oscillations and other instabilities in a transmission line;
   wherein each of the plurality of transformer-less IIUs includes a plurality of switching devices, a capacitor, a sensor for the transmission line, and a power supply that is to extract power from the transmission line to generate a DC voltage across the capacitor.

2. The intelligent impedance injection module of claim 1, wherein:
   the injection gain comprises a first, higher gain or a second, lower gain;
   the power swings comprise changes in power transfer due to line switching, or line faults or generator faults that exceed a threshold.

3. The intelligent impedance injection module of claim 1, wherein the power swings are changes in power transferred over the transmission line that create instability during re-energization of the transmission line after a fault-related incident.

4. The intelligent impedance injection module of claim 1, wherein:
   the IIUs are in a series-parallel configuration in the IIM.

5. The intelligent impedance injection module of claim 1, wherein:
   the intelligent impedance injection module is installed as one of a plurality of IIMs separated from each other on a mobile carrier, each IIM having an insulated standoff.

6. The intelligent impedance injection module of claim 1, wherein:
   the controller has a bypass mode to take the intelligent IIM off-line but retain a capability for fault monitoring and communication.

7. An intelligent impedance injection module (IIM) for use with transmission lines in a power grid, comprising:
   a plurality of transformer-less impedance injector units (IIUs); and
   a controller, to change injection gain of the plurality of transformer-less IIUs to a first gain for initial response to a power transfer anomaly in a transmission line and change the injector gain of the plurality of transformer-less IIUs to a lower, second gain after a specified time;
   wherein each of the plurality of transformer-less IIUs includes a plurality of switching devices, a capacitor, and a power supply that is to extract power from the transmission line to generate a DC voltage across the capacitor.

8. The intelligent impedance injection module of claim 7, wherein the controller is to change the injector gain to the lower, second gain after the specified time to prevent the power grid from experiencing oscillations induced by rise and fall times of injected impedance.

9. The intelligent impedance injection module of claim 7, wherein:
   the intelligent impedance injection module is installed as one of a plurality of IIMs separated from each other on a mobile carrier, each IIM having an insulated standoff.

10. The intelligent impedance injection module of claim 7, further comprising:
    a sensor, coupled to the transmission line for detection of the anomaly in the transmission line.

11. The intelligent impedance injection module of claim 7, wherein:
    the plurality of transformer-less IIUs are operable with pseudo-ground at a high-voltage power line voltage of the transmission line.

12. The intelligent impedance injection module of claim 7, wherein:
    each switching device comprises a power IGBT (insulated gate bipolar transistor) device.

13. The intelligent impedance injection module of claim 7, further comprising:
    a protection switch arranged to open across impedance injection terminals of the intelligent IIM for impedance injection, and to close across the impedance injection terminals to bypass the impedance injection and protect devices and circuit from damage and failure.

14. A method of impedance injection for a transmission line in a power grid, performed by an intelligent impedance injection module (IIM), the method comprising:
    setting injection gain of a plurality of transformer-less impedance injection units (IIUs) of the IIM, coupled to the transmission line, to a first, higher gain state for initial response to a change in power transfer or power flow incident in the transmission line; and
    changing the injection gain of the plurality of IIUs to a lower, second gain state after a pre-set time;
    wherein the intelligent IIM includes a plurality of switching devices, a capacitor, and a power supply that is to extract power from the transmission line to generate a DC voltage across the capacitor.

15. The method of claim 14, wherein changing the injection gain to the lower, second gain state after the pre-set time is to prevent buildup of oscillations in the power grid after power flow change has settled.

16. The method of claim 14, wherein:
    setting the injection gain to the first, higher gain state is during a fault, or fault reset or following detection of an increase or decrease in power transfer over the transmission line;
    setting the injection gain to the first, higher gain state comprises changing the injection gain from a normal value to the first, higher gain state; and
    changing the injection gain to the lower, second gain state comprises resetting the injection gain to the normal value.

17. The method of claim 14, further comprising:
    monitoring the transmission line through a sensor of the IIM, to detect the change in power transfer or power flow incident.

18. The method of claim 14, further comprising:
    receiving high power swing information over a communication link;
    determining whether the high power swing information exceeds a fault threshold; and
    entering a bypass mode that takes the intelligent IIM off-line, but retaining capability for fault monitoring and communication, responsive to determining the high power swing information exceeds the fault threshold.

19. The method of claim 14, wherein changing the injection gain to the lower, second gain state comprises changing state of one or more of the plurality of switching devices coupled to the capacitor, in the intelligent IIM.

\* \* \* \* \*